United States Patent [19]
Gysel et al.

[11] Patent Number: 5,115,440
[45] Date of Patent: May 19, 1992

[54] DELAY DISTORTION COMPENSATING CIRCUIT FOR OPTICAL TRANSMISSION SYSTEM

[75] Inventors: Hermann Gysel; Mani Ramachandran, both of San Jose, Calif.

[73] Assignee: Synchronous Communications, Inc., San Jose, Calif.

[21] Appl. No.: 637,072

[22] Filed: Jan. 3, 1991

[51] Int. Cl.⁵ .............................. H01S 3/00
[52] U.S. Cl. ........................... 372/38; 372/26
[58] Field of Search ............ 372/25, 26, 33, 38; 350/96.29, 96.30

[56] References Cited

U.S. PATENT DOCUMENTS

| | | | |
|---|---|---|---|
| 4,677,630 | 6/1987 | Fujita et al. | 372/32 |
| 4,785,454 | 11/1988 | Olsson et al. | 372/26 |
| 4,789,987 | 12/1988 | Fraser | 372/31 |
| 4,884,278 | 11/1989 | Nishimoto et al. | 372/26 |

Primary Examiner—Frank Gonzalez
Attorney, Agent, or Firm—Fliesler, Dubb, Meyer & Lovejoy

[57] ABSTRACT

A delay distortion compensating circuit for a laser driven optical transmission system comprises a varactor network for producing a time shift of the instantaneous amplitude of the modulation signal applied to the laser that is inverse to the time shift caused by chromatic dispersion of a fiber optic cable used for propagating the output of the laser and laser chirp so that the sum of the two time shifts is substantially equal to a constant. In one embodiment the cathode of the varactor diode is coupled to a center tap of an inductor called a first order delay equalizer, the terminals of which are connected to a source of a modulating signal and the laser. A d-c bias is applied to the varactor by means of a choke. In another embodiment called a low pass structure, a modulating signal is coupled to the laser through an inductor and a parallel combination of a discrete capacitor and a varactor diode is coupled between ground and a node located between the inductor and the laser. D-c bias is provided to the varactor by means of a resistor.

18 Claims, 4 Drawing Sheets

DELAY DISTORTION COMPENSATING CIRCUIT FOR OPTICAL TRANSMISSION SYSTEM

BACKGROUND OF THE INVENTION

1. Field of the Invention

The present invention relates to optical transmission systems in general and in particular to a delay distortion compensating circuit for use in a laser driven fiber optic transmission system.

2. Description of the Prior Art

The transmission of modulated signals in laser driven fiber optic transmission systems is becoming more and more widespread as the need for transmission bandwidth and high signal-to-noise transmissions increases. For example, more and more cable television systems and other information transmission systems, e.g. telephone systems, which normally transmit vast amounts of information over long distances are using such optical transmission systems.

A typical optical transmission system comprises a laser on its transmitting end and a photodetector on its receiving end. The laser and the photodetector, which may be separated by many kilometers, are coupled by a fiber optic cable.

In operation, modulating signals modulate the light, i.e. optical power output, of the laser. The modulated light then propagates through the fiber optic cable to the photodetector.

A problem encountered in the conventional laser driven fiber optic transmission system is waveform delay distortion caused by phenomena known as laser chirp and chromatic dispersion.

Laser chirp comprises a shift in the frequency/wavelength of the output of the laser as a result of the modulation of the laser. Compared to the wavelength of an unmodulated output from the laser, as the amplitude of the modulation signal increases in a positive direction the wavelength of the output tends to decrease and as the amplitude of the modulation signal increases in a negative direction the wavelength of the output tends to increase.

In the fiber optic cable, this shift in wavelength and a chromatic dispersion of the transmitted laser beam results in a delay distortion comprising an amplitude dependent time delay at the receiving end. For example, in a standard or conventional single mode fiber optic cable, the dispersion of the light having a wavelength of 1310 nanometers (nm) is essentially zero while at a wavelength of 1550 nm the dispersion is approximately 17 picoseconds/nanometer-kilometer (ps/nm-km).

SUMMARY OF THE INVENTION

In view of the foregoing, principal objects of the present invention are a method and an apparatus comprising a compensation circuit for compensating for the delay distortion caused by laser chirp and chromatic dispersion in a laser driven fiber optic transmission system.

In accordance with the above objects, there is provided a compensation circuit comprising a varactor diode network. The network is inserted between a source of the laser modulating signal and the laser for providing a compensating delay of the modulating signal applied to the laser.

The network comprises either an allpass structure or a low pass structure. The allpass structure, which provides a more precise compensation, affects only the phase and not the amplitude of the modulating signal. In contrast, the low pass structure affects both the phase and the amplitude of the modulating signal.

BRIEF DESCRIPTION OF THE DRAWINGS

The above and other objects, features and advantages of the present invention will become apparent from the following detailed description of the accompanying drawings, in which.

DETAILED DESCRIPTION OF THE DRAWINGS

Figure 1:
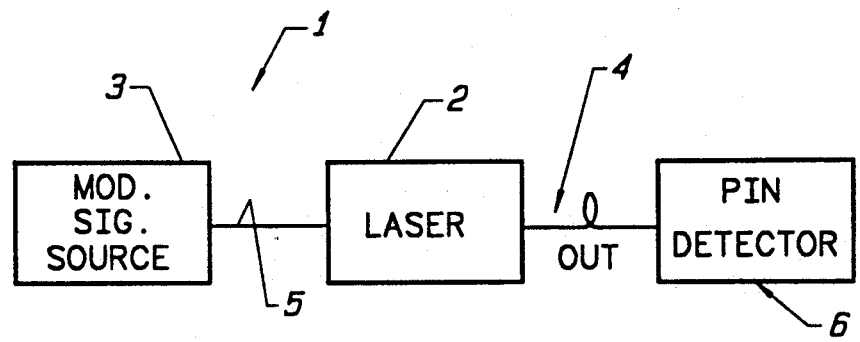
FIG. 1 is a block diagram of a prior known conventionally modulated laser.

Referring to FIG. 1, there is shown a simplified block diagram of a typical prior known optical transmission system designated generally as 1. In the system 1 there is provided a laser 2, such as a diode laser, a source 3 of modulating signals and a fiber optic cable designated generally as 4 and a PIN detector 6.

In operation, a modulating signal is generated in the source 3 and applied to the laser 2 by means of a modulating input signal line 5. The modulating signal on the line 5 modulates the optical power output of the laser 2 and provides a modulated laser beam to the PIN detector 6 on the fiber optic cable 4.

Figure 2:
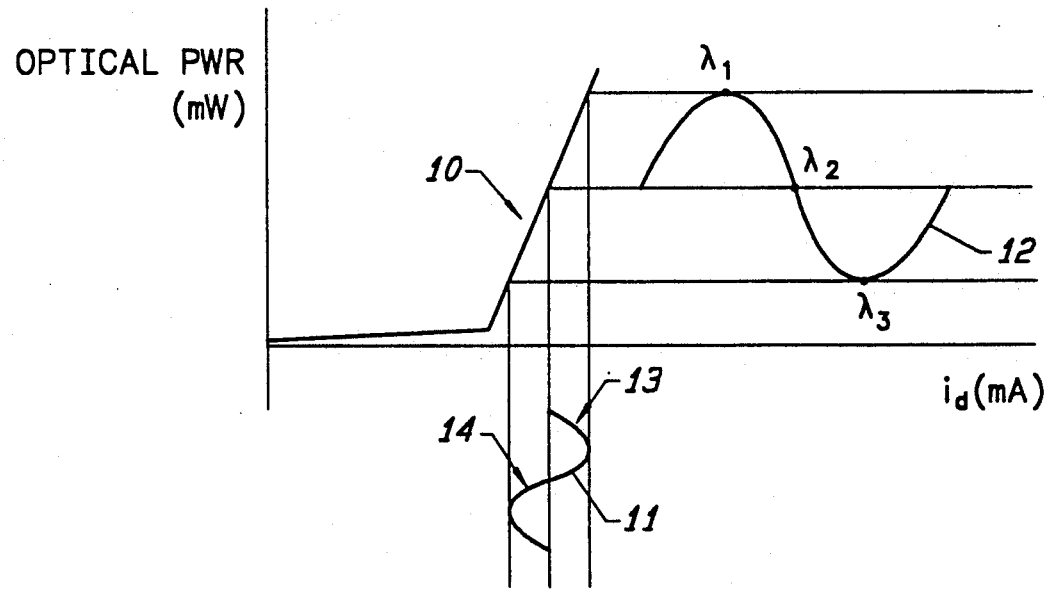
FIG. 2 is a diagram of optical power output versus laser diode current for a modulating signal.

Referring to FIG. 2, there is shown a curve 10 of optical power versus laser diode current $i_d$. A modulating signal 11 applied to the laser provides a modulated output signal 12, the amplitude of which is a function of the amplitude of the modulating signal 11.

As indicated above, the modulation of a conventional laser diode produces a shift in the frequency/wavelength of the output of the laser as a result of the modulation. This phenomena is called "laser chirp". Compared to the wavelength $\lambda_2$ of an unmodulated output from the laser, as the amplitude of the modulation signal increases in a positive direction as shown at 13 on the waveform 11, the wavelength $\lambda_1$ as shown on waveform 12 tends to decrease and as the amplitude of the modulation signal increases in a negative direction as shown at 14 on waveform 11, the wavelength $\lambda_3$ of the output of the laser tends to increase with the result that $\lambda_1$ is less than $\lambda_3$.

Figure 3:
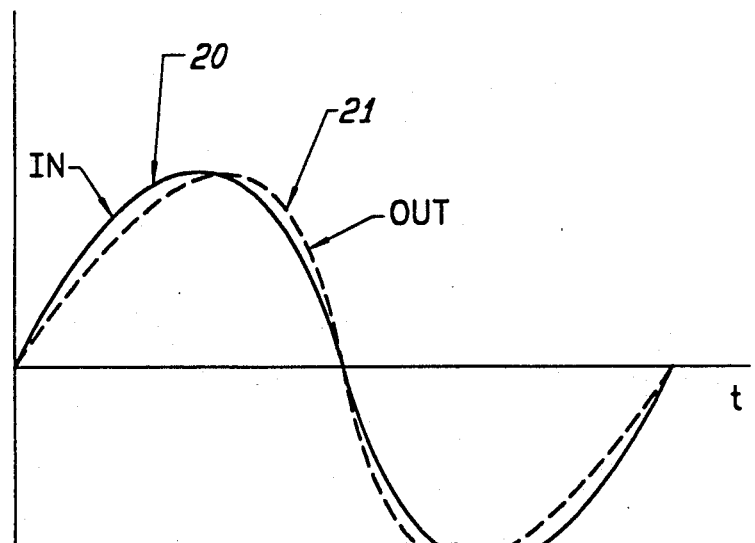
FIG. 3 is a diagram representing a modulating input signal and a distorted output at the receiving end of a laser driven fiber optic transmission system due to laser chirp and chromatic dispersion.

In the fiber optic cable 4 the output of the laser is dispersed in a manner which produces a nonlinear distortion of the modulation signal as shown in FIG. 3.

Referring to FIG. 3, there is shown a modulation signal 20 corresponding to waveform 11 of FIG. 2 which is input to the laser and a resulting signal 21, the amplitude of which is delayed, i.e. time shifted, in a non-constant fashion in the fiber optic cable due to a combination of the laser chirp and chromatic dispersion.

Figure 4:
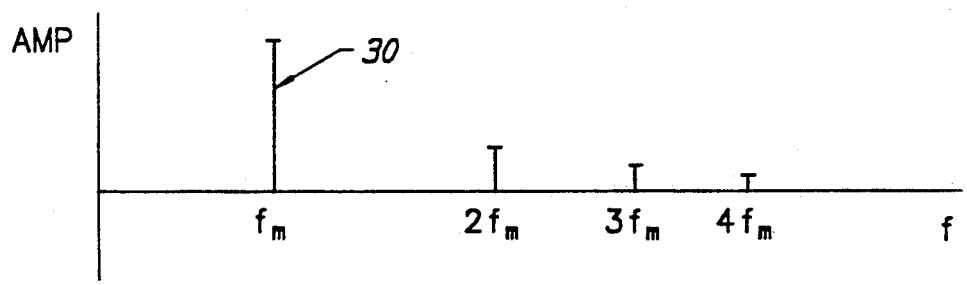
FIG. 4 is a partial spectrum representing spectral lines resulting from the distortion caused by laser chirp and chromatic dispersion.

Referring to FIG. 4, there is shown a representation of a partial spectrum of the delayed signal as it appears at the PIN detector 6 of FIG. 1. In the absence of the distortion, the spectrum of the output of the laser in the fiber optic cable would comprise a single line 30 centered at the modulation frequency $f_m$. However, due to the distortion, multiple spectral lines of decreasing amplitude are generated at integer multiples of the modulation frequency, e.g. $2f_m$, $3f_m$, $4f_m$, etc.

Figure 5:
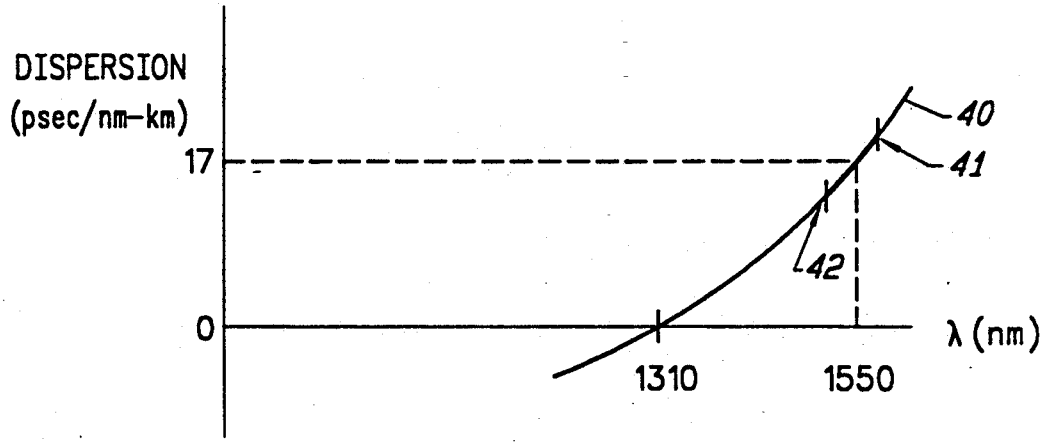
FIG. 5 is a diagram of dispersion versus wavelength in a conventional single mode fiber optic cable.

Referring to FIG. 5, there is shown a representative diagram of dispersion of a standard single mode fiber in picoseconds/nanometer-kilometer (ps/nm-km) versus wavelength $\lambda$. At a wavelength of 1310 nanometers, the dispersion is nil. However, at a wavelength of 1550 nanometers, the dispersion is approximately 17 ps/nm-km. The curve 40 in FIG. 5 between the points 41 and 42 shows that as the wavelength of the output of the laser varies due to modulation, the magnitude of the dispersion induced delay also varies.

Figure 6:
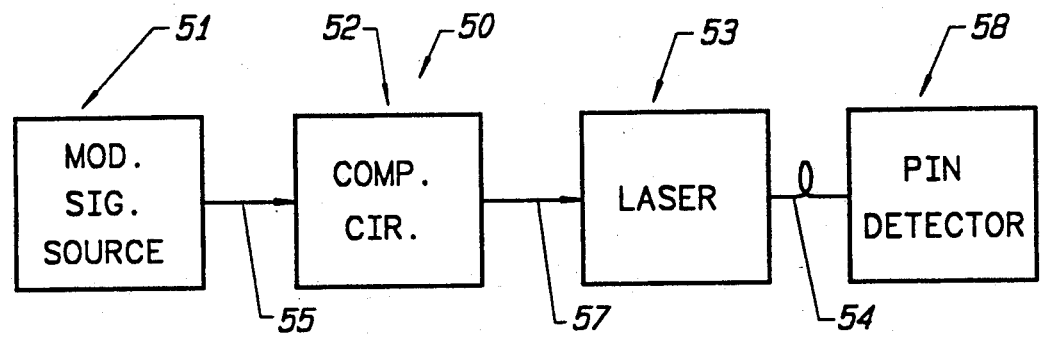
FIG. 6 is a block diagram of an embodiment of the present invention.

Referring to FIG. 6, there is provided in accordance with the present invention a simplified block diagram of an optical transmission system designated generally as 50. In the system 50 there is provided a conventional source 51 of modulating signals $V_{SIG}$, a delay distortion compensation circuit 52, and a diode laser circuit 53. Coupled to the output of the laser circuit 53 by means of a fiber optic cable 54 there is provided a PIN detector 58.

As will be further described below, in the operation of the apparatus of FIG. 6, the modulating signal $V_{SIG}$ from the source 51 is applied to the input of the compensation circuit 52 by means of a signal line 55. The output of the compensation circuit 52 is coupled to the laser 53 by a signal line 57.

Figure 7:
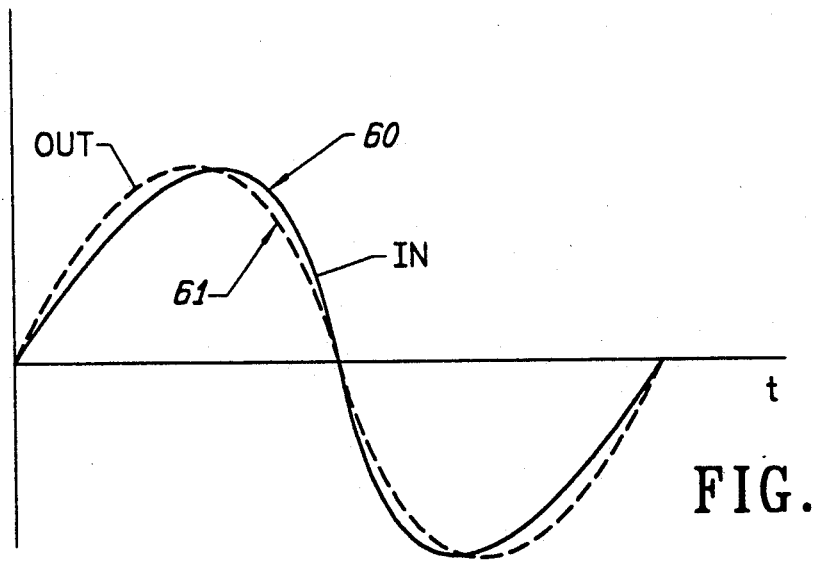
FIG. 7 is a diagram of a modulating signal and a compensated output at the receiving end of the system of FIG. 6.

Referring to FIG. 7, a solid line 60 is provided to represent the modulating signal $V_{SIG}$ from the source 51 appearing on the signal line 55 which is applied to the input of the compensation circuit 52. A dash line 61 is provided to represent the signal at the output of the compensation circuit 52 which is provided on the signal line 57 to the laser circuit 53. In comparing the signals 60 and 61 of FIG. 7 with the corresponding signals 20 and 21 of FIG. 3, it can be seen that the compensation circuit 52 time shifts, i.e. delays, the output signal 61 appearing on the signal line 57 relative to the input signal 60 appearing on the signal line 55 in a fashion and by an amount which compensates for the delay distortion caused by laser chirp and chromatic dispersion.

Figure 8:
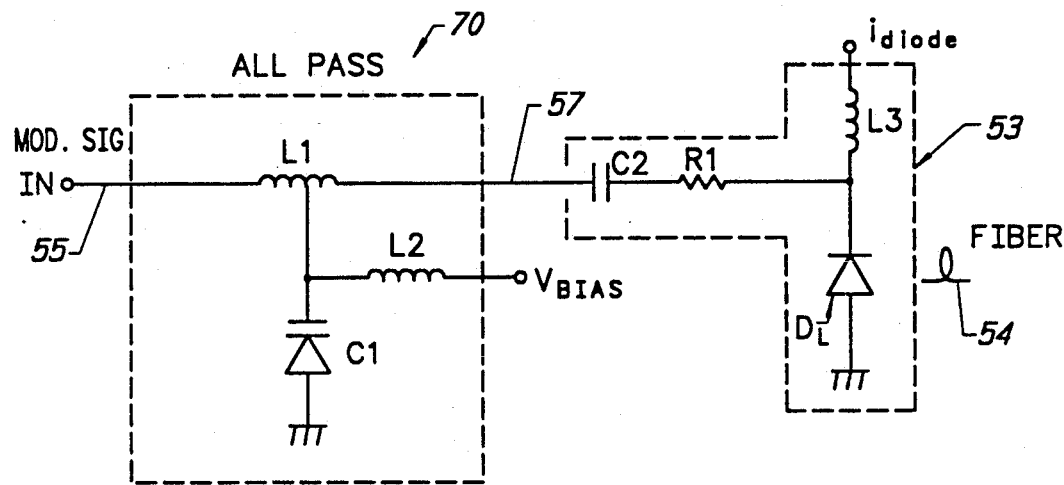
FIG. 8 is a schematic of an allpass compensation circuit according to a first embodiment of the present invention.

Referring to FIG. 8, in a first embodiment of the present invention, the compensation circuit 52 of FIG. 6 comprises an allpass varactor diode network designated generally as 70. In the network 70, also called a first order delay equalizer, there is provided an inductor L1, an inductor L2 and a varactor diode C1. In the laser circuit 53 there is provided a capacitor C2, a resistor R an inductor L3 and a laser diode $D_L$. One end of the inductor L1 is coupled to the modulating signal source 51 by means of the signal line 55 while the opposite end of the inductor L1 is coupled to the laser circuit 53 by means of the signal line 57. The cathode of the varactor diode C1 is coupled to the inductor L1 intermediate the ends thereof. A d-c bias voltage $V_{BIAS}$ is coupled to a node between the cathode of the varactor C1 and the inductor L1 by means of the inductor L2. The inductor L2 comprises a choke having sufficient inductance to block high frequency modulation signals from the source of the bias voltage $V_{BIAS}$. The anode of the varactor C1 is coupled to ground, as is the anode of the laser diode $D_L$. The capacitor C2 comprises a decoupling capacitor. The resistor R2 comprises a resistance of approximately 50 ohms and the inductor L3 comprises a choke having an inductance sufficient to block high frequency modulation signals from a source of laser diode current $i_{diode}$.

Figure 9:
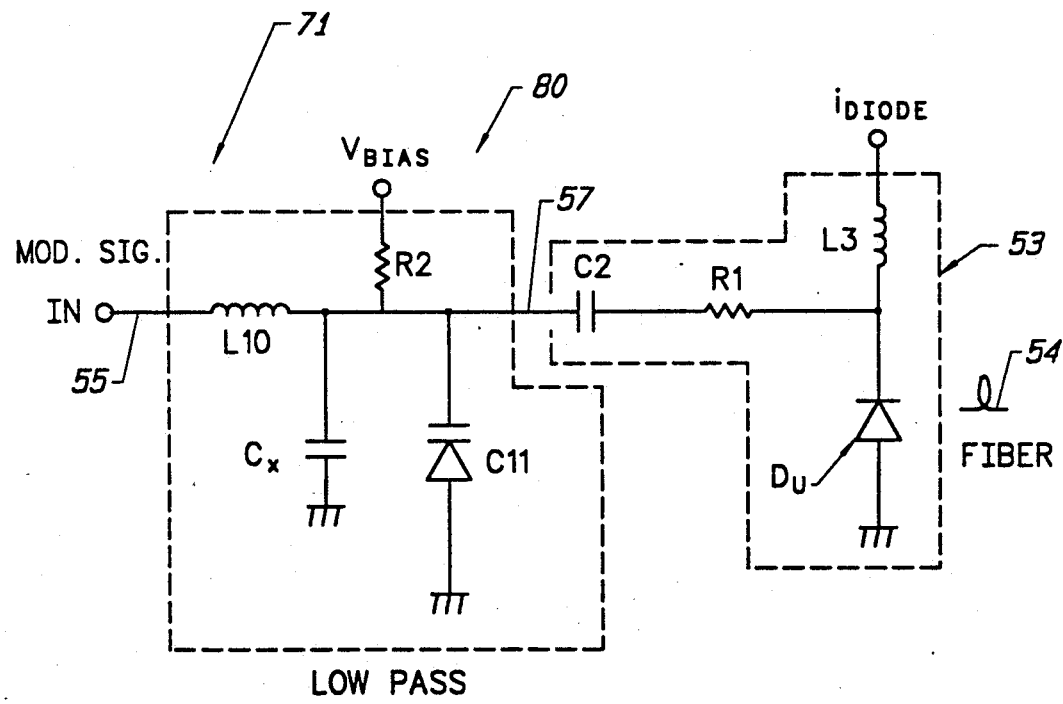
FIG. 9 is a schematic diagram of a lowpass compensation circuit according to another embodiment of the present invention.

Referring to FIG. 9, in another embodiment of the present invention the compensation circuit 52 of FIG. 6 comprises a lowpass varactor diode network designated generally as 80. In the network 80 there is provided an inductor L10, a capacitor $C_x$, a varactor diode C11 and a resistor R2. One end of the inductor L10 is coupled to the signal line 55. The opposite end of the inductor L10 is coupled to the signal line 57. The capacitor $C_x$ and the varactor diode C11 are coupled to ground and in parallel to the signal line 57. A d-c bias voltage $V_{BIAS}$ is coupled to the cathode of the varactor C11 by means of the resistor R2. The components in the laser circuit 53 are described above with respect to FIG. 8.

As briefly described above, if uncompensated, the maximum positive and negative excursions $V_{peak\pm}$ of the modulating signal voltage $V_{SIG}$ applied to the laser $D_L$ cause corresponding shifts $\Delta\lambda_\pm$ in the laser wavelength. This results in a modulating signal amplitude dependent time delay $T_{chirp}$ at the receiving end of the fiber optic cable 54 coupled to the laser $D_L$ as a result of fiber dispersion. This delay is given by $$T_{chirp\pm} = D \times l \times \Delta\lambda_\pm \qquad (1)$$

where $\Delta\lambda_\pm$ are the positive and negative shifts in the laser wavelength because of variation in modulation signal amplitude, l is the distance in km of the fiber optic cable, and D is the dispersion in ps/nm-km. Typical values of these quantities are l = 12 km
D = 17 ps/nm-km
$\Delta\lambda_\pm$ ±0.1 nm
$T_{chirp\pm}$ = ±20.4 ps To compensate for the time delay $T_{chirp}$, the modulating signal applied to the laser diode $D_L$ is provided by means of the compensation circuit 52 to have a corresponding compensating group delay $T_{gd\pm}$ wherein $$T_{gd\pm} + T_{chirp+} = Constant = T_{chirp-} + T_{gd+} \qquad (2)$$

independent of signal amplitude.

For each of the embodiments of FIGS. 8 and 9, the required compensating group delay $T_{gd\pm}$ can be found from equation 2 and typical values for the components in each of the circuits of FIGS. 8 and 9 for each of the two peak values $V_{peak\pm}$ can be determined from the following equations.

Referring to the allpass varactor network 70 of FIG. 8, generating the required time delay $T_{gd\pm}$ in the circuit 70 that will satisfy equation 2 necessitates using the varactor diode C1, reverse biased at the right voltage $V_{dc}$. From the values of $T_{gd\pm}$ determined from equation 2, the values of $\alpha_\pm$, which are used for determining the maximum and minimum capacitance of the varactor diode C1, are first found from equation 3 below:

$$\alpha_\pm = \frac{1 \pm \sqrt{1 - (T_{gd\pm}\omega)^2}}{2T_{gd\pm}} \quad (3)$$

wherein the value of $\alpha_\pm$ depends on the highest modulation frequency $\omega$ in the system. For example, in a typical cable television system $\omega = 2\pi \times 550$ MHz. These values of $\alpha_\pm$ are then used to calculate the capacitances $C_\pm$ of the varactor C1 using the formula $$C_\pm = 2/(R \times a_{35}) \quad (4)$$

where R is the desired impedance of the structure. This structure impedance along with the capacitance will decide the inductance L1 since $$R^2 = \sqrt{(L1C_+)} = \sqrt{(L1/C_-)} \quad (5)$$

The dependence of the varactor capacitance on the reverse bias voltage applied thereto is given by $$C_{35} = C_O(V_{DC} + V_{peak\pm})^{-\gamma} 0.5\gamma 1.2 \quad (6)$$

where $C_O$ = capacitance of the varactor C1 at zero voltage and $\gamma$ is the varactor exponent.

The varactor C1 is chosen with a particular value of $\gamma$, and operated at a specific reverse bias voltage $V_{DC}$, so that the varactor capacitance varies from $C_-$ to $C_+$ as the signal voltage varies from $V_{peak-}$ to $V_{peak+}$.

Typical values for the structure are $V_{DC} = 3.6$ volts, $C_O = 4$ pF, L1 = 10 nH, $\gamma = 0.74$.

Referring to the lowpass varactor network 80 of FIG. 9, and using the group delay $T_{gd\pm}$ as found from equation 2 above, the values of the circuit components of the network 80 can be determined from the above equations and the following equation wherein the group delay for the network 80 is given by $$T_{gd} = LC_x\left(1 + \frac{C_0}{C_x}\right) \cdot (V_{CD} + V_{sig}) - \gamma \quad (7)$$

Typical values of quantities in the above equation 7 to compensate for a chirp of $\Delta\lambda_\pm$ of 0.25 nm for a length l of 13 km are L = 10 nH, $C_x = 1$ pF, $C_O = 5$ pF, $V_{DC} = 3.3$ volts, $\gamma = 0.74$. As will be noted, equation 7 requires a 6 point fit to the required value of $T_{gd\pm}$.

While preferred embodiments of the present invention are described above, it is contemplated that various modifications may be made thereto without departing from the spirit and scope of the present invention. Accordingly, it is intended that the embodiments described be considered only as illustrative of the present invention and that the scope thereof should not be limited thereto but be determined by reference to the claims hereinafter provided and their equivalents.

What is claimed is:

1. In a laser driven optical transmission system having a laser for providing a modulated optical output in response to a modulation signal applied thereto and a fiber optic cable for propagating said modulated optical output, said laser including means which produces laser chirp in response to said modulation signal and said fiber optic cable including means which produces chromatic dispersion of said modulated optical output, a delay distortion compensation circuit for compensating for a time shift in said modulated optical output caused by said chromatic dispersion of said fiber optic cable and said laser the improvement comprising:
    means for producing a time shift of the instantaneous amplitude of said modulation signal applied to said laser that is inverse to said time shift caused by said chromatic dispersion of said fiber optic cable and said laser chirp so that the sum of the two time shifts is substantially equal to a constant.

2. In an optical transmission system according to claim 1 wherein said means for producing said time shift of the instantaneous amplitude of said modulation signal applied to said laser comprises:
    means for providing an inductance; and
    means for providing a capacitance coupled to said inductance, said capacitance having a magnitude which varies in response to the amplitude of said modulation signal.

3. In an optical transmission system according to claim 2 wherein said inductance providing means comprises means for providing a first inductance and said capacitance providing means comprises a varactor diode, means for coupling said varactor diode to said first inductance providing means and means for providing a predetermined bias voltage to said varactor diode.

4. In an optical transmission system according to claim 3 wherein said inductance providing means comprises means for providing a second inductance and said means for providing a predetermined bias voltage to said varactor diode comprises said second inductance providing means.

5. In an optical transmission system according to claim 3 wherein said means for coupling said varactor diode to said first inductance providing means comprises means for coupling said varactor diode to a tap between the ends of said first inductance providing means.

6. In an optical transmission system according to claim 2 wherein said inductance providing means comprises means for providing a first inductance and said capacitance providing means comprises a first capacitance providing means and a varactor diode coupled in parallel, means for coupling said varactor diode and said first capacitance providing means to said first inductance providing means and means for providing a predetermined bias voltage to said varactor diode.

7. In an optical transmission system according to claim 6 wherein said first capacitance providing means comprises a discrete capacitor.

8. In an optical transmission system according to claim 2 wherein said inductance providing means comprises means for providing a first inductance and said capacitance providing means comprises a varactor diode and means for providing a predetermined bias voltage to said varactor diode, said varactor diode comprising an anode and a cathode, means for coupling said anode to a predetermined reference potential and said cathode to said first inductance providing means and said bias voltage providing means comprising means for providing a second inductance and means for coupling said second inductance providing means between a node located between said cathode and said predetermined bias voltage providing means.

9. In an optical transmission system according to claim 2 wherein said inductance providing means comprises means for providing a first inductance and said capacitance providing means comprises a capacitor and a varactor diode coupled in parallel and means for providing a predetermined bias voltage to said varactor diode, said varactor diode comprising an anode and a cathode, means for coupling said anode to a predetermined reference potential and said cathode to said first inductance providing means and said bias voltage providing means comprising means for providing a resistance and means for coupling said resistance between a node located between said cathode and said predetermined bias voltage providing means.

10. In a laser driven optical transmission system having a laser for providing a modulated optical output in response to a modulation signal applied thereto and a fiber optic cable for propagating said modulated optical output, said laser including means which produces laser chirp in response to said modulation signal and said fiber optic cable including means which produces chromatic dispersion of said modulated optical output, a method of compensating for a time shift in said modulated optical output caused by said chromatic dispersion of said fiber optic cable and said laser the improvement comprising the steps of:

producing a time shift of the instantaneous amplitude of said modulation signal applied to said laser that is inverse to said time shift caused by said chromatic dispersion of said fiber optic cable and said laser chirp so that the sum of the two time shifts is substantially equal to a constant.

11. A method according to claim 10 wherein said step of producing said time shift of the instantaneous amplitude of said modulation signal applied to said laser comprises the steps of:

providing an inductance; and providing a capacitance coupled to said inductance, said capacitance having a magnitude which varies in response to the amplitude of said modulation signal.

12. A method according to claim 11 wherein said step of providing said inductance comprises the step of providing a first inductance and said step of providing said capacitance comprises the steps of providing a varactor diode, coupling said varactor diode to said first inductance providing means and providing a predetermined bias voltage to said varactor diode.

13. A method according to claim 12 wherein said step of providing said inductance comprises the step of providing a second inductance and said step of providing a predetermined bias voltage to said varactor diode comprises the step of providing said second inductance providing means.

14. A method according to claim 12 wherein said step of coupling said varactor diode to said first inductance providing means comprises the step of coupling said varactor diode to a tap between the ends of said first inductance providing means.

15. A method according to claim 10 wherein said step of providing said inductance comprises the step of providing a first inductance and said step of providing said capacitance comprises the step of providing a first capacitance and a varactor diode coupled in parallel, coupling said varactor diode and said first capacitance providing means to said first inductance providing means and providing a predetermined bias voltage to said varactor diode.

16. A method according to claim 15 wherein said step of providing said first capacitance comprises the step of providing a discrete capacitor.

17. A method according to claim 10 wherein said step of providing said inductance comprises the step of providing a first inductance and said step of providing a capacitance comprises the steps of providing a varactor diode and providing a predetermined bias voltage to said varactor diode, said varactor diode comprising an anode and a cathode, coupling said anode to a predetermined reference potential and said cathode to said first inductance providing means and said step of providing said bias voltage comprises the steps of providing a second inductance and coupling said second inductance providing means between a node located between said cathode and said predetermined bias voltage providing means.

18. A method according to claim 10 wherein said step of providing said inductance providing means comprises the step of providing a first inductance, said step of providing said capacitance comprises the step of providing a capacitor and a varactor diode coupled in parallel and providing a predetermined bias voltage to said varactor diode, said varactor diode comprising an anode and a cathode, coupling said anode to a predetermined reference potential and said cathode to said first inductance providing means and said step of providing said bias voltage providing means comprises the steps of providing a resistance and coupling said resistance between a node located between said cathode and said predetermined bias voltage providing means.

* * * * *